United States Patent [19]

Labock et al.

[11] Patent Number: 4,571,455
[45] Date of Patent: Feb. 18, 1986

[54] ELECTRONIC MONITORING SYSTEM PARTICULARLY USEFUL AS AN ELECTRONIC BABYSITTER

[76] Inventors: Yoram Labock, 9 Bavly St., Tel-Aviv; Israel Feuerstein, 59 Aharonson St., Ramat-Gan; Avi Geiger, 6 Biniamini St., Tel-Aviv, all of Israel

[21] Appl. No.: 558,434

[22] Filed: Dec. 6, 1983

[51] Int. Cl.⁴ ............................................. H04M 11/04
[52] U.S. Cl. ....................................... 179/2 A; 179/5 R
[58] Field of Search ................ 179/2 A, 2 AM, 5 R, 179/5 P, 90 B, 90 BD, 81 R; 340/505, 566, 526, 529

[56] References Cited

U.S. PATENT DOCUMENTS

| | | | |
|---|---|---|---|
| 3,461,241 | 8/1969 | Menke | 179/5 P |
| 4,095,050 | 6/1978 | Beachem et al. | 179/2 A |
| 4,196,311 | 4/1980 | Hoven | 179/2 A X |
| 4,255,619 | 3/1981 | Saito | 179/2 A |
| 4,493,947 | 1/1985 | Loveless | 179/2 A |

FOREIGN PATENT DOCUMENTS

2723745 12/1978 Fed. Rep. of Germany ...... 340/566

*Primary Examiner*—Gene Z. Rubinson
*Assistant Examiner*—W. J. Brady
*Attorney, Agent, or Firm*—Benjamin J. Barish

[57] ABSTRACT

An electronic monitoring system particularly useful as a telephone babysitter comprises a monitoring unit connectable to the telephone line at the location to be monitored, and a portable sound-producing unit for actuating the monitoring unit from a remote telephone handset via the telephone line. The monitoring unit at the monitored location includes a microphone, a code detector detecting a predetermined code transmitted by the portable sound-producing unit, a keyboard for storing the telephone number of a selected remote telephone handset, a sound level comparator, automatic dialling means, and a microcomputer including a plurality of settable flags controlling the monitoring unit according to preprogrammed routines and in response to the transmission of preselected codes by the portable sound-producing unit. Thus, one code connects the remote telephone handset to the microphone of the monitoring unit, and another code causes the monitoring unit to automatically dial the number of the stored telephone handset number when the sound level at the location of the monitoring unit exceeds a threshold value predetermined number of times during a predetermined time period.

3 Claims, 10 Drawing Figures

FIG. 4  START PROGRAM

FIG. 5 MAIN LOOP

FIG. 6 RINGING TEST ROUTINE

FIG. 7
ANSWER RING ROUTINE

FIG. 9 DIALING ROUTINE

4,571,455

ELECTRONIC MONITORING SYSTEM PARTICULARLY USEFUL AS AN ELECTRONIC BABYSITTER

BACKGROUND OF THE INVENTION

The present invention relates to electronic monitoring systems, and particularly to such systems useful as "babysitters" for monitoring a particular space from a remote location.

A number of monitoring systems have been devised for use as electronic babysitters. In general, the known systems include radio transmitters which transmit the sounds from the monitored area to a radio receiver carried by the parent. However, such known systems are of limited range because of the need to regulate radio transmissions in view of the crowded condition of the air-waves.

An object of the present invention is to provide an electronic monitoring system, particularly useful as a babysitter, which enables almost any area to be conveniently monitored from a virtually unlimited range.

According to the present invention, there is provided an electronic monitoring system comprising monitoring means connectable to the telephone line at the location to be monitored; and a portable sound-producing unit for transmitting first and second codes to the monitoring means via a remote telephone and the telephone line. The monitoring means includes: a microphone for picking up local sounds at the location to be monitored; a sound level comparator comparing the sounds picked up by the microphone with a predetermined threshold value; means for manually presetting and storing the number of a selected remote telephone; a code detector for detecting the code transmitted by the portable sound-producing unit to the monitoring means via the remote telephone and the telephone line; and automatic dialing means for automatically dialing the selected remote telephone number. The system further includes alarm indicating means indicating an alarm condition when the sound picked up by the microphone exceeds the predetermined threshold value for a predetermined time; and means effective: (a) upon detecting the first code from the portable sound-producing unit to enable the listener at the remote telephone to hear via the telephone line the sounds picked up by the microphone; and (b) upon detecting the second code from the portable sound-producing unit, to automatically dial the selected remote telephone number whenever the alarm condition is indicated by the alarm indicating means.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Overall Construction

Figure 1:
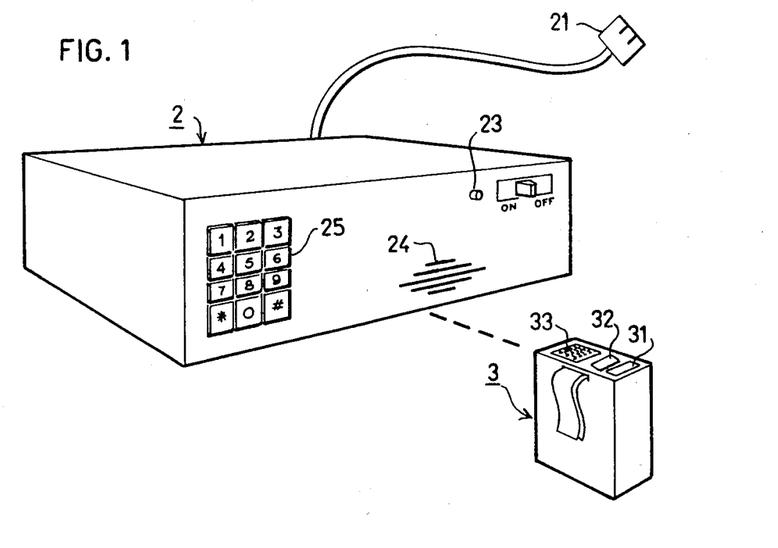
FIG. 1 illustrates the two main units, mainly the local monitoring unit and the portable sound-producing unit, in one form of monitoring system constructed in accordance with the present invention.

The electronic monitoring system illustrated in the drawings comprises two basic units, namely, a monitoring unit generally designated 2 in FIG. 1, to be located at a site to be monitored; and a portable sound-producing unit, generally designated 3, to be carried by the parent or other person enabling him to communicate with the monitoring unit 2 via the standard telephone line. Briefly, the monitoring unit 2 includes a telephone plug 21 enabling the unit to be plugged into the telephone line at the location to be monitored, an On/Of switch 22 for turning on or off the monitoring unit, an indicator lamp 23 for indicating whether the unit is turned, on, a microphone 24 for picking up local sounds at the location of the monitoring unit, and a keyboard 25 for inputting the telephone number of a preselected telephone handset at a remote location from which the local area is to be monitored. The portable sound-producing unit 3 is in the form of a beeper, including two (or more) push buttons 31,32, to generate and transmit tones, serving as predetermined codes, into the remote telephone handset via a small speaker 33, and a clip 34 facilitating wearing of the portable unit by the user.

Figure 2:
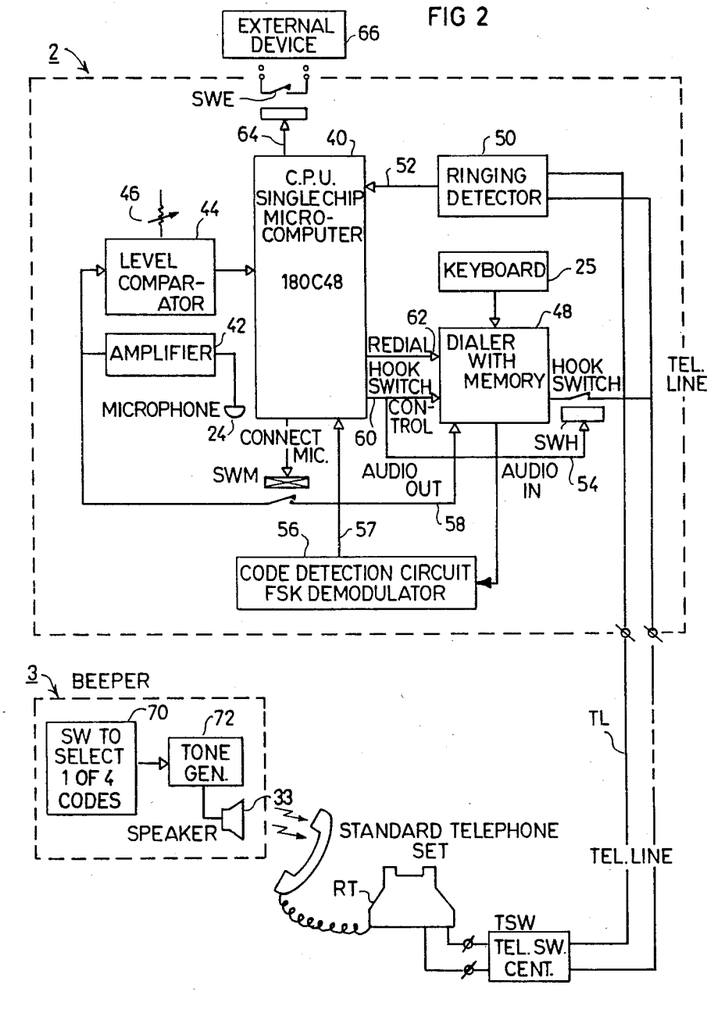
FIG. 2 is a block diagram illustrating the monitoring system of FIG. 1 and the means enabling communication to be established from the portable sound-producing unit and the local monitoring unit via the telephone line.

The functional construction of the local monitoring unit 2 and the portable sound-producing unit 3, and particularly the manner in which the two units communicate with each other, are more particularly illustrated in FIG. 2.

The Local Monitoring Unit 2

The local monitoring unit 2 is controlled by a microcomputer 40 (FIG. 2) which includes a plurality of settable flags (more particularly illustrated in FIG. 3) for controlling the operation of the monitoring unit according to preprogrammed routines. The local monitoring unit 2 further includes an amplifier 42 for amplifying the sounds picked up by the microphone 24, and a sound level comparator 44 for comparing the sound level of the picked-up sounds with a predetermined threshhold value. The output of comparator 44 is fed into the microcomputer 40, and the threshhold value may be preselected by an adjustable device 46.

Keyboard 25, provided on the local monitoring unit 2 in order to input the telephone number of a remote telephone handset, controls a dialler 48. The latter is provided with a memory in order to store the inputted telephone number.

The local monitoring unit 2 is connectable to the telephone line TL, which provides a means for establishing communication between the monitoring unit and the portable sound producing unit 3 via any remote handset RT and the telephone switching center TSW. Thus, by plugging in the local monitoring unit 2 via its telephone plug 21, into the telephone socket at the monitored location, the telephone line TL is connected to a telephone hook switch SWH and to a ringing detector 50 included in the local monitoring unit 2. The ringing detector 50 controls the microcomputer 40, as schematically indicated by path 52. The microcomputer in turn controls the hook switch SWH, as schematically shown by path 54.

A code detection circuit 56, which may be of the FSK (frequency shift keying) demodulator type, is connected to the audio input from the telephone line TL and controls microcomputer 40, via path 57, according to the code transmitted, as will be described below.

Microcomputer 40 controls a microphone switch SWM which, under certain conditions as will be described more particularly below, connects the microphone amplifier 42 to the telephone line TL via path 58 and dialler 48. Microcomputer 40 further controls dialler 48 via "hook switch control" path 60, and "redial" path 62.

The monitoring unit may also be used for controlling an external device, such as a light switch to turn on the lights in the event of a predetermined preprogrammed condition. For this purpose, the monitoring unit 2 includes a further switch SWE controlled by the microcomputer 40 via path 64 for controlling the external device, designated 66 in FIG. 2.

The Portable Sound-Producing Unit 3

The portable sound-producing unit 3 includes a circuit, generally designated 70, for selecting any one of a plurality of codes according to the depression of its push buttons 31, 32 (FIG. 1). The code-selecting circuit 70 controls a tone generator 72 according to the code selected, which generated tone is outputted via speaker 33. This tone is transmitted via the remote telephone handset RT, the telephone switching center TSW, and the telephone line TL, to the monitoring unit 2 located in the area being monitored. As indicated earlier, the actual code transmitted is detected by the code-detection circuit 56 in the monitoring unit 2, and controls the microprocessor 40 via path 57.

In the example to be described below, the portable sound-producing unit 3 is capable of generating four different codes, to control the local monitoring unit 2, as follows:

(1) Code No. 1 is a first tone of short duration, and is effective to identify the person communicating with the local monitoring unit from a remote telephone handset RT, and to enable the person to hear, for a preset time period (e.g. 60 seconds), what is happening in the monitored area;

(2) Code No. 2 is the same tone as code No. 1, but for a longer period of time, and permits the user to listen longer than the preset period of time to the sounds produced in the monitored area; optionally, Code No. 2 can also be effective to actuate the external device 66 (FIG. 2), such as an electrical light switch.

(3) Code No. 3 is a second tone of short duration, and is effective to inform the local monitoring unit 2 that the user has reached the location of the remote telephone number stored within dialler 48, and thus to enable the local monitoring unit for active operation. As will be described more fully below, when the local monitoring unit 2 is enabled for active operation, it continuously monitors the sound at the monitored area, and whenever this sound exceeds a predetermined threshhold value (as determined by comparator 44) a predetermined number of times during a predetermined time frame (as determined by the microcomputer 40), the local monitoring unit automatically dials the remote telephone number stored within dialler 48 (where the user is located) to inform him of this condition and to permit him to listen to the sounds in the monitored area picked up by the microphone 24. When the user leaves the remote area of the stored remote telephone number, he retransmits Code No. 3, which thereby disables the monitoring unit for active operation and returns it only to passive operation.

(4) Code No. 4 is the tone of Code No. 3, but for a longer period of time. In the system to be described, it is provided as an option for use to perform another optional function, such as to actuate another external device, e.g. an alarm in a neighbor's house.

The Microcomputer 40 and its Programmed Routines

Figure 3:
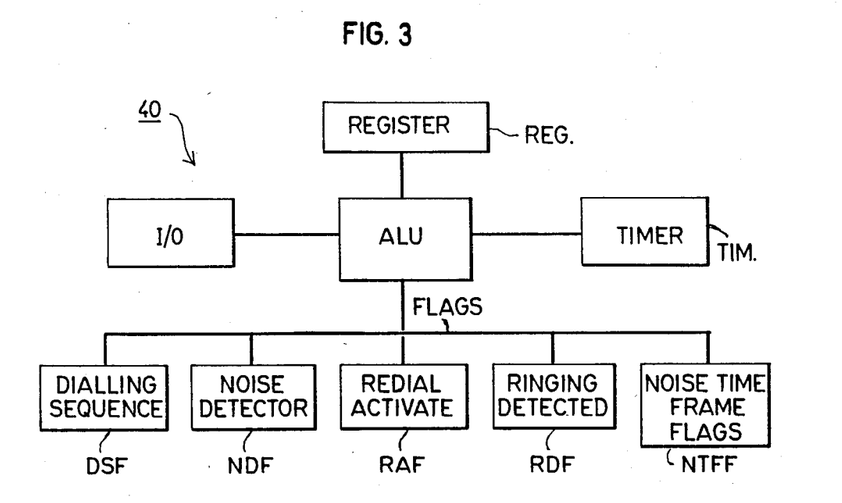
FIG. 3 is a block diagram illustrating the main functional components of the microcomputer included in the system illustrated in FIG. 2.

The main functional elements of the microcomputer 40 included in the monitoring unit 2 are more particularly illustrated in FIG. 3. Thus, the microcomputer includes an arithmetic logic unit ALU, input/output circuitry I/O, registers REG, a timer TIM, and a plurality of flags which may be set upon the occurrence of preselected conditions to control the monitoring unit 2 according to preprogrammed routines.

The most important flags are Dialling Sequence Flag DFF, Noise Detected Flag NDF, Redial Activate Flag RAF, Ringing Detected Flag RDF, and Noise Time Frame Flag NTFF.

Figures 6, 7:
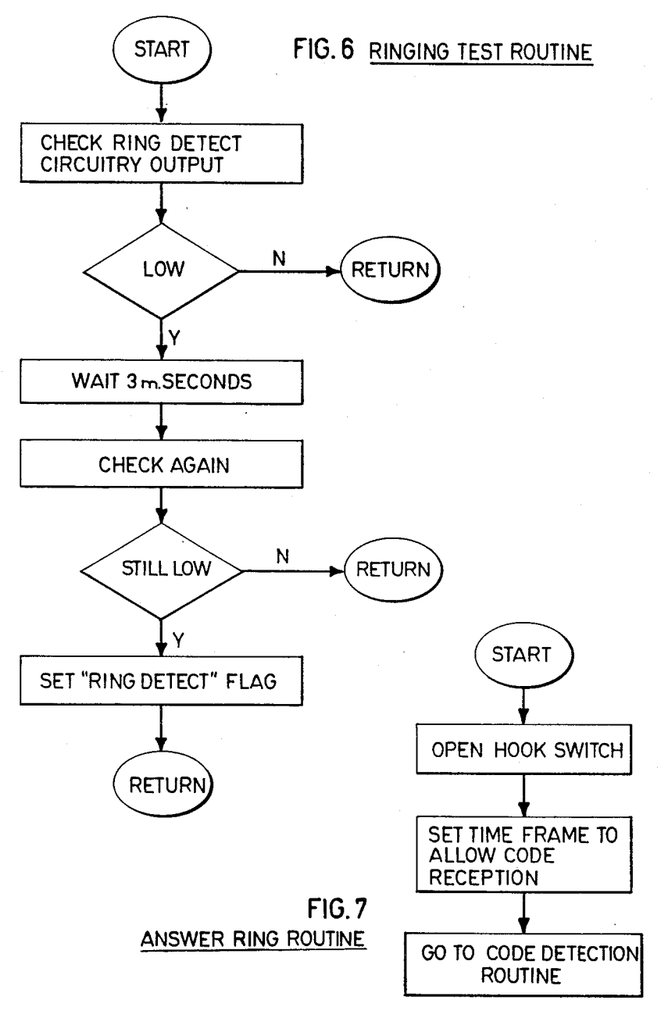
FIGS. 6–10 illustrate specific routines or sequences of operation of the microcomputer in the system of FIG. 2.

The most important routines are Ringing Test Routine, illustrated in FIG. 6, Answer Ring Routine, illustrated in FIG. 7; Noise Detect Routine, illustrated in FIG. 8; Dialing Routine, illustrated in FIG. 9; and Code Detection Routine, illustrated in FIG. 10. A number of other routines, e.g., Interrupt Routine and Decode Routine, are also involved but these are well-known and therefore not specifically illustrated.

Figure 4:
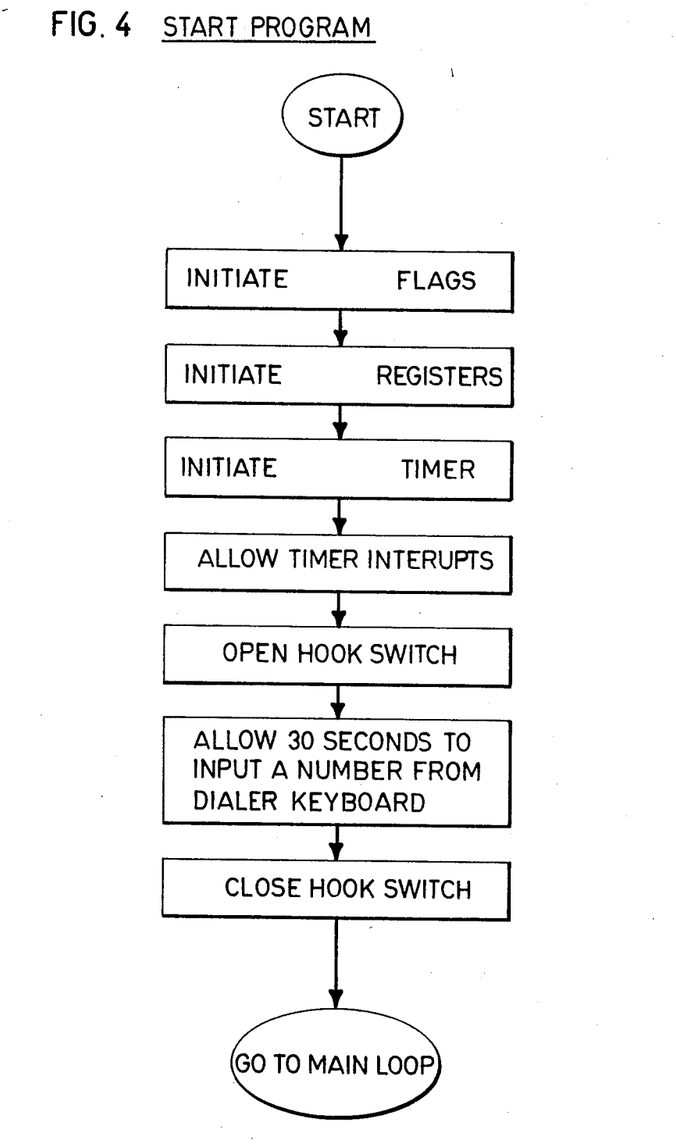
FIG. 4 is a flow diagram illustrating the operation of the microcomputer in the system of FIG. 2.

FIG. 4 illustrates the Start Program, which is initiated by turning switch 22 (FIG. 1) to its "on" position. This resets all the flags of the local monitoring unit 2, as described above and as illustrated in FIG. 3, and also resets all its registers REG and the timer TIM. This also starts the timer TIM and opens the hook switch SWH (FIG. 2) to allow 30 seconds for the user to input, via push buttons 25 (FIG. 1) and dialer 48 (FIG. 2), the telephone number at the remote location where the user expects to be and from where he wishes to monitor the local site. After the 30 seconds have elapsed, the hook switch SWH is closed, and the program then proceeds to the "Main Loop," as illustrated in FIG. 5.

Figure 5:
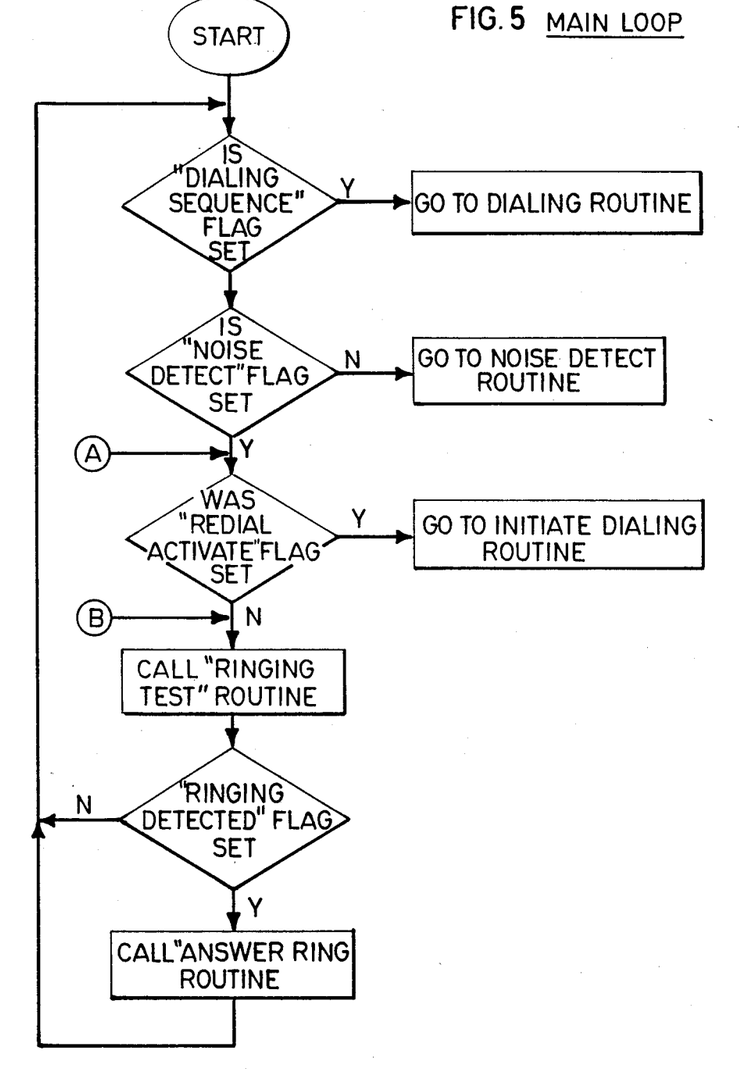
FIG. 5 is a block diagram illustrating the Main Loop in the programmed operations of the microcomputer of FIG. 2.
Figure 9:
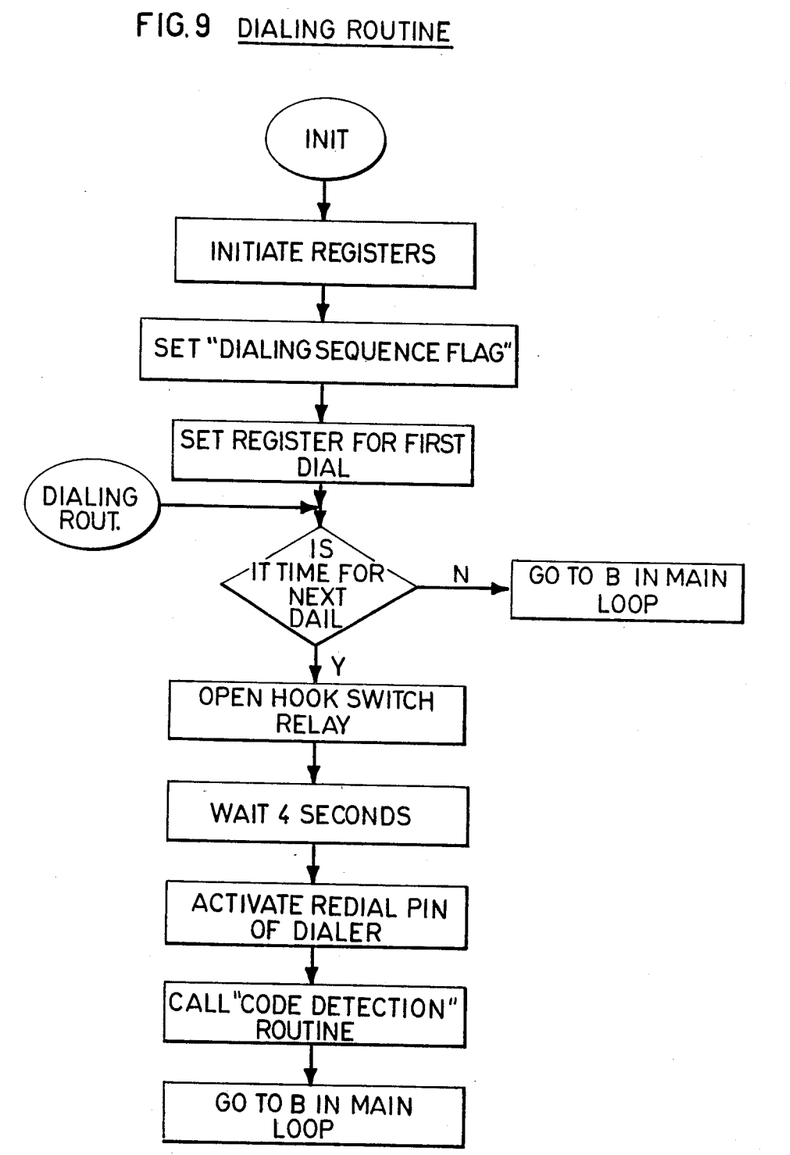

As shown in FIG. 5, in the Main Loop, the program considers whether the Dialling Sequence Flag (DSF) has been set; if "yes," the program proceeds to the Dialling Routine, illustrated in FIG. 9, where it dials the stored, remote telephone number.

Figure 8:
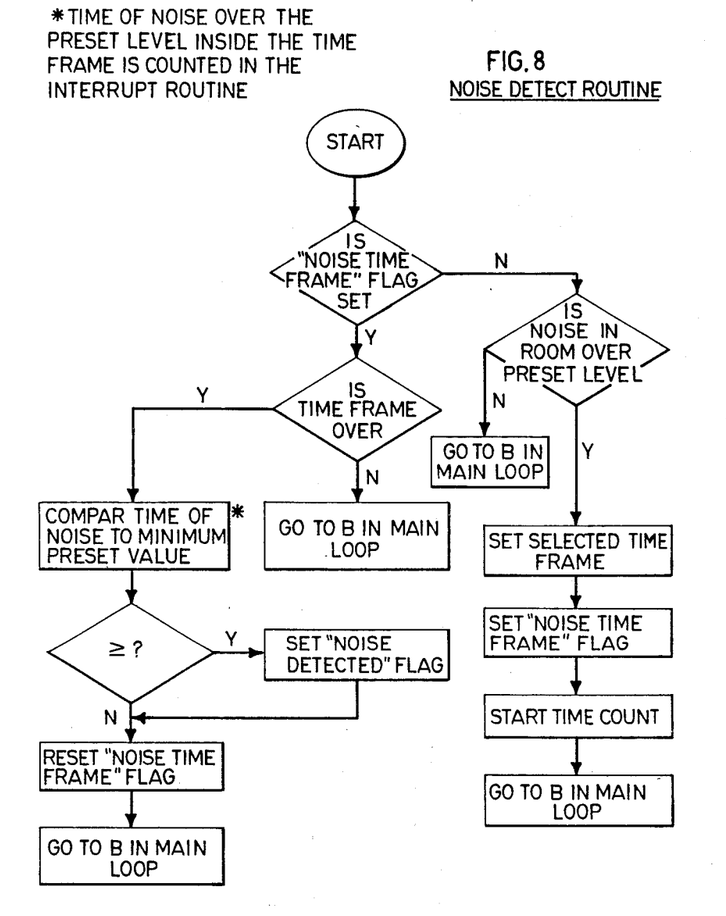

If flag DSF has not been set, the program then considers whether the Noise Detected Flag (NDF has been set; if "no," the program proceeds to the Noise Detect Routine, illustrated in FIG. 8, to determine whether the noise in the monitored area is excessive, when considering the preprogrammed threshhold value, number and time frame.

If flag NDF has been set, the program then proceeds to consider whether the Redial Activate Flag RAF has been set; if "yes," the program proceeds to the Dialling Routine illustrated in FIG. 9, but if "no," the program then proceeds to the Ringing Test Routine, illustrated in FIG. 6.

The program of the Main Loop then proceeds to consider whether the Ringing Detected Flag RDF has been set; if "no," the program proceeds to the beginning of the Main Loop; but if the flag RDF has been set, the program proceeds to the Answer Ring Routine illustrated in FIG. 7, following which the program returns to the Start of the Main Loop.

FIG. 6 illustrates the Ringing Test Routine, which is entered into during the Main Loop of FIG. 5 when the Redial Activate Flag RAF is found to be in its reset condition during the Main Loop. In this routine, the output of the Ringing Detector circuit 50 is checked, and if it is found to be "low," it is rechecked again after waiting three milliseconds, and if it is still found to be "low," the "Ringing Detected flag RDF is set.

Figure 10:
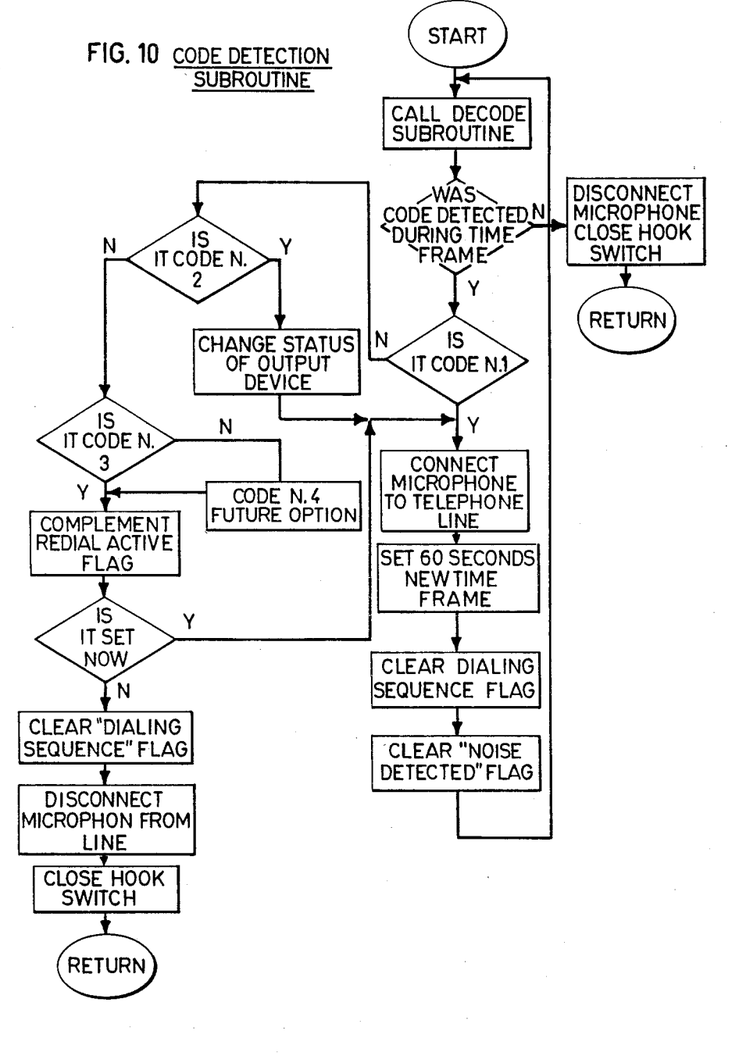

In the Answer Ring Routine illustrated in FIG. 7, which is entered into after the Ringing Detected Flag RDF has been set in the Main Loop, the hook SWH is opened; and after a preset time interval, such as 30 seconds to allow for code reception, the program proceeds to the Code Detection Routine illustrated in FIG. 10.

In the Noise Detect Routine illustrated in FIG. 8, which is entered into during the Main Loop only when the Noise Detect Flag DFF is not set, the program considers whether the Noise Time Frame Flag NTFF is set; if "no," the Routine considers whether the sound in the monitored area, as picked up by microphone 24, exceeds the threshhold value as preset in the sound level comparator 44. If this threshhold value is not exceeded, the program proceeds to point "B" of the "Main Loop"; but if it is exceeded, the program proceeds to set the selected time frame in the registers REG (e.g. 60 seconds) and to set the Noise Time Frame Flag. It also starts the time count and then goes to point "B" in the Main Loop.

If, however, the Noise Time Frame Flag NTFF, at the beginning of the Noise Detect Routine, was in its set condition, then the program considers whether the preset time frame (e.g. 60 seconds) has elapsed; if "no," the program proceeds to point "B" in the Main Loop.

If the preset time frame has elapsed, then the program compares the time of noise to the minimum preset value. If it exceeds this minimum preset value, the program sets the Noise Detector Flag NDF and then proceeds to reset the Noise Time Frame Flag NTFF; if the noise time, however, was less than the preset value, the program resets the Noise Time Frame Flag NTFF. After the latter flag has been reset, the program proceeds to point "B" in the Main Loop.

In the Dialling Routine illustrated in FIG. 9, which is entered into during the Main Loop only when the Dialling Sequence Flag DSF is found to be set, the registers REG are reset; and then the remote telephone number is entered into the registers via the push buttons 25 (FIG. 1) and the dialler 48 (FIG. 2. If during each dial, the time for the next dial has not yet arrived, the program proceeds to point "B" in the Main Loop. However, if the time for the next dial has arrived, the program proceeds to open the hook switch SWH, waits four seconds, activates the redial pin of the dialler 48, performs the Code Detection Routine, and then proceeds to point "B" in the Main Loop.

The Code Detection Routine illustrated in FIG. 10 is entered into during the Answer Ring Routine of FIG. 7, or the Dialling Routine of FIG. 9. During this Routine, the program first considers whether a code was detected during the time frame; if "no," the program disconnects the microphone 24 and closes hook switch SWH, and returns to the Main Loop.

If, however, a code was detected during the set time frame, the Code Detection Routine of FIG. 10 then determines which of the four possible codes, as discussed above, was detected.

If Code No. 1 was detected, the microcomputer 40 actuates the microphone switch SWM to connect microphone 24 to the telephone line TL, to allow the person at the remote telephone RT, who transmitted Code No. 1 via his portable sound-producing unit 3, to hear the sounds picked up by the microphone in the monitored area. A new time frame of 60 seconds is also set, and the Dialling Sequence Flag DSF and Noise Detector Flag NDF are reset, following which the microcomputer is returned to the Start of the Code Detection Routine.

If Code No. 1 is not detected, the program then checks to see whether Code No. 2 is detected. If yes, it changes the status of the external device (e.g., actuates the electric light switch), and also returns to the beginning of the Routine when Code No. 1 was detected, to permit the user to continue hearing the sounds picked up by the local microphone 24.

If Code No. 2 is not detected, the program then checks to see whether the code is Code No. 3; if "yes," it actuates (complements) the Redial Activate Flag RAF and, assuming it is now set, connects the microphone 24 to the telephone line to enable the user to hear the sounds in the monitored area. If the Redial Activate Flag is not set, the program then clears the Dialling Sequence Flag DSF, disconnects the microphone 24 from the line, closes the hook switch SWH, and returns the microcomputer to the Main Loop.

Code No. 4 is not shown in the Code Detection Routine of FIG. 10 as performing any particular function, but rather this code is reserved as an option for other functions, e.g., for actuating one or more other external devices, such as an electrical alarm at a neighbor's house.

SUMMARY OF OPERATION

In summary, it will be seen that the illustrated mounting system is used and operates as follows:

First, the monitoring unit 2 is plugged into the telephone line, via its telephone plug 21, at the local site to be monitored. The main switch 22 is turned on, and the telephone number at the remote location where the user expects to be is then inputted via the push buttons 25.

When the user arrives at the remote location, he uses the remote telephone set RT to dial the telephone number at the monitoring unit 2 and, when the line has been connected, uses his portable sound-producing unit 3 to transmit any one of the preselected four codes over the telephone line to the monitoring unit 2.

If the user transmits Code No. 1, e.g. a short tone A, the code detection circuit 56 in the monitoring unit 2 decodes the signal and controls the microprocessor to actuate microphone switch SWM to connect microphone 24 to the telephone line TL. The user may thus listen in, for a preset period of time, on the sounds at the monitored area.

If the user wishes to monitor the area for a longer period of time, he may use his sound-producing unit 3 to transmit Code No. 2, a longer sound A. This Code No. 2 can also be used to cause the microcomputer 40 to actuate an external device 66 (FIG. 2), e.g., an electric light switch, via external switch SWE.

If the user, however, transmits Code No. 3, this informs the monitoring unit 2 that he has reached the location of the remote telephone number stored in the memoray register of dialler 48, and enables the monitoring unit to its Active Operation Mode. During this mode, if and when the noise exceeds a predetermined volume, as preset by the sound level comparator 44, a predetermined number of times (e.g., eight times) during a predetermined time period (e.g., 60 seconds), the monitoring unit will automatically dial the number of the remote telephone handset RT stored in the memory of the dialler 48, and thereby connect the microphone 24 to the remote telephone handset RT, enabling the user to hear the noise in the monitored area. When the user leaves the location of the remote telephone number, he may again transmit Code No. 3, whereupon the monitoring unit will be disabled from its active mode, and be returned to its passive mode.

It will be appreciated that all the components of the monitoring unit 2 and of the portable unit 3, as illustrated in FIG. 2, are individually known in existing telephone and related systems. The microcomputer 40 may also be one of the known designs, such as Microcomputer Chip I 80 C 48. The techniques for programming such microcomputers to perform the above-described functions are also well-known and described in the literature. Accordingly, further details of the construction of the components or of the illustrated monitoring system or of the manner of programming microcomputer 40 to perform the above-described functions, are not deemed necessary.

It will also be appreciated that the monitoring system described can be used for monitoring conditions other than, or in addition to, sound, such as fire; in such a case, the system would include a fire detector, in addition to the microphone at the monitored area, which fire detector would be programmed to transmit an alarm to the remote telephone number, when Code No. 3 is transmitted, or to a neighbor's house.

Many other variations, modifications, and applications of the invention will be apparent.

What is claimed is:

1. An electronic monitoring system comprising monitoring means connectable to the telephone line at the location to be monitored; and a portable sound-producing unit for transmitting first and second codes to said monitoring means via a remote telephone and the telephone line; said monitoring means including:
    a microphone for picking up local sounds at said location to be monitored;
    a sound level comparator comparing the sounds picked up by said microphone with a predetermined threshold value;
    means for manually presetting and storing the number of a selected remote telephone;
    a code detecting for detecting the code transmitted by said portable sound-producing unit to said monitoring means via said remote telephone and the telephone line;
    automatic dialing means for automatically dialing said selected remote telephone number; and
    control means including
    alarm indicating means indicating an alarm condition when the sound picked up by said microphone exceeds said predetermined threshold value for a predetermined time; and means effective:
    (a) upon detecting said first code from said portable sound-producing unit to enable the listener at the remote telephone to hear via the telephone line the sounds picked up by said microphone; and
    (b) upon detecting said second code from said portable sound-producing unit, to automatically dial said selected remote telephone number whenever said alarm condition is indicated by said alarm indicating means.

2. The system according to claim 1, wherein said portable sound-producing unit is capable of transmitting a third code effective, upon being detected by said code-detector in said monitoring means, to actuate an external device at the location of said monitoring means.

3. The system according to claim 1, wherein said control means comprises a micro-computer including a plurality of flags which are selectively set upon the occurence of any one of a plurality of preselected conditions to control the monitoring means according to preprogrammed routines.

* * * * *